(12) United States Patent
Uberti et al.

(10) Patent No.: US 12,544,669 B2
(45) Date of Patent: Feb. 10, 2026

(54) INPUT SYSTEM

(71) Applicant: Sony Interactive Entertainment Inc., Tokyo (JP)

(72) Inventors: David Erwan Damien Uberti, London (GB); Philip Cockram, London (GB); Christopher William Henderson, London (GB)

(73) Assignee: Sony Interactive Entertainment Inc.

( * ) Notice: Subject to any disclaimer, the term of this patent is extended or adjusted under 35 U.S.C. 154(b) by 314 days.

(21) Appl. No.: 18/180,570

(22) Filed: Mar. 8, 2023

(65) Prior Publication Data

US 2023/0293996 A1     Sep. 21, 2023

(30) Foreign Application Priority Data

Mar. 16, 2022 (GB) ...................... 2203650

(51) Int. Cl.
| | |
|---|---|
| *A63F 13/42* | (2014.01) |
| *A63F 13/211* | (2014.01) |
| *A63F 13/213* | (2014.01) |
| *A63F 13/58* | (2014.01) |
| *A63F 13/65* | (2014.01) |

(Continued)

(52) U.S. Cl.
CPC ............ *A63F 13/58* (2014.09); *A63F 13/211* (2014.09); *A63F 13/213* (2014.09); *A63F 13/42* (2014.09); *A63F 13/65* (2014.09); *A63F 13/92* (2014.09); *G06F 3/0304* (2013.01); *G06T 7/246* (2017.01); *G06T 11/00* (2013.01); *G06T 2207/30196* (2013.01)

(58) Field of Classification Search
CPC ...... A63F 13/58; A63F 13/211; A63F 13/213; A63F 13/42; A63F 13/65; A63F 13/92; G06T 7/246; G06F 3/0304
See application file for complete search history.

(56) References Cited

U.S. PATENT DOCUMENTS

| | | |
|---|---|---|
| 6,132,045 A | 10/2000 | Gauvreau |
| 8,221,290 B2 | 7/2012 | Vincent et al. |

(Continued)

FOREIGN PATENT DOCUMENTS

| | | |
|---|---|---|
| CN | 207182864 U | 4/2018 |
| EP | 4252873 A2 | 10/2023 |

(Continued)

OTHER PUBLICATIONS

Combined Search and Examination Report for corresponding GB Application No. GB 2203650.3, 10 pages, dated Nov. 15, 2022.

(Continued)

*Primary Examiner* — David L Lewis
*Assistant Examiner* — Shauna-Kay Hall
(74) *Attorney, Agent, or Firm* — Fish & Richardson P.C.

(57) ABSTRACT

An input system comprising: a first input device comprising a display and one or more sensors, wherein the first input device is configured to generate one or more inputs of a first type; a second input device comprising an attachment unit for removably attaching the first input device to the second input device, wherein the second input device is configured to generate one or more inputs of a second type; and a processing device configured to receive the one or more inputs of the first type and the one or more inputs of the second type.

15 Claims, 2 Drawing Sheets

(51) Int. Cl.
  *A63F 13/92* (2014.01)
  *G06F 3/03* (2006.01)
  *G06T 7/246* (2017.01)
  *G06T 11/00* (2006.01)

(56) References Cited

U.S. PATENT DOCUMENTS

| | | | |
|---|---|---|---|
| 8,276,288 | B1 | 10/2012 | Yu |
| 8,939,831 | B2 | 1/2015 | Dugan |
| 10,434,422 | B2 | 10/2019 | Dugan |
| 2002/0090985 | A1 | 7/2002 | Touchner et al. |
| 2002/0160883 | A1 | 10/2002 | Dugan |
| 2004/0198474 | A1 | 10/2004 | Jung |
| 2005/0150124 | A1 | 7/2005 | Greenawalt et al. |
| 2005/0227811 | A1 | 10/2005 | Shum et al. |
| 2009/0251484 | A1* | 10/2009 | Zhao ............ H04M 1/72427 345/592 |
| 2009/0305789 | A1 | 12/2009 | Patil |
| 2010/0036736 | A1 | 2/2010 | McGee et al. |
| 2011/0152637 | A1 | 6/2011 | Kateraas et al. |
| 2012/0142429 | A1 | 6/2012 | Muller |
| 2012/0190416 | A1 | 7/2012 | Song et al. |
| 2012/0315986 | A1 | 12/2012 | Walling |
| 2012/0319951 | A1* | 12/2012 | Lee ................. G06F 3/016 345/161 |
| 2013/0113878 | A1* | 5/2013 | Zalewski ............. A63F 13/22 348/42 |
| 2013/0154958 | A1 | 6/2013 | Clavin |
| 2013/0281213 | A1* | 10/2013 | Yasuda ............. A63F 13/42 463/39 |
| 2015/0120023 | A1 | 4/2015 | Terrell |
| 2016/0217601 | A1* | 7/2016 | Tsuda ............... A63F 13/655 |
| 2017/0216675 | A1 | 8/2017 | Goslin et al. |
| 2018/0234831 | A1 | 8/2018 | Liu et al. |
| 2020/0038763 | A1 | 2/2020 | Dugan |
| 2020/0298129 | A1* | 9/2020 | Bress ............... A63F 13/822 |
| 2020/0306625 | A1 | 10/2020 | Palmer et al. |
| 2020/0327692 | A1 | 10/2020 | Lin |
| 2020/0372713 | A1 | 11/2020 | Hewitt et al. |
| 2020/0384365 | A1 | 12/2020 | Nakamura et al. |
| 2021/0029224 | A1 | 1/2021 | Fuchs et al. |
| 2021/0052976 | A1 | 2/2021 | Anderson et al. |
| 2021/0197082 | A1 | 7/2021 | Seibert |
| 2021/0228988 | A1 | 7/2021 | Francesus et al. |
| 2021/0260470 | A1 | 8/2021 | Maitlen et al. |
| 2023/0024653 | A1 | 1/2023 | Gould et al. |
| 2023/0293999 | A1 | 9/2023 | Uberti et al. |
| 2023/0310985 | A1 | 10/2023 | Uberti et al. |
| 2024/0286019 | A1 | 8/2024 | St-Miche |

FOREIGN PATENT DOCUMENTS

| | | |
|---|---|---|
| TW | 201242359 A | 10/2012 |
| WO | 2007130691 A2 | 11/2007 |
| WO | WO 2017033110 A2 | 3/2017 |
| WO | WO 2020205340 A1 | 10/2020 |

OTHER PUBLICATIONS wikipedia.org [online], "Network bridge," Mar. 26, 2022, retrieved on Apr. 22, 2025, retrieved from URL <https://en.wikipedia.org/w/index.php?title=Network_bridge&oldid=1079382004>, 5 pages.

* cited by examiner

INPUT SYSTEM

BACKGROUND OF THE INVENTION

Field of Invention

The present invention relates to an input system.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Input systems are used for a variety of applications and typically comprise at least one input device. Example input devices include a computer mouse, a keyboard, handheld controllers, such as the DualSense® controller, motion sensors, temperature sensors, touchscreens, or any other device that may generate an input.

An input, to be used within a system, may be generated by an input device in a huge variety of ways. For example, a keyboard may generate an input when a key is pressed, where one key may generate a different input to another key. A motion sensor, however, may generate an input in dependence upon the motion of the motion sensor, such as the velocity or acceleration of the motion sensor. Meanwhile, a handheld controller may comprise a joystick, which may generate an input in dependence upon the position of the joystick relative to the joystick's default position, or a trigger, which may generate an input that varies in dependence upon the displacement of the trigger relative to the trigger's default position or may generate an input in response to the trigger being displaced from the trigger's default position by a predetermined amount.

Different types of input device may be more suitable than other types depending upon the use for the inputs. Using the context of video games as an example, a handheld controller may be a more suitable input device for a driving game in comparison to a keyboard, as a joystick and trigger may both provide an analogue input for the steering and acceleration controls, which may enable precise control of a vehicle within the driving game. A keyboard however, would only be able to provide binary inputs, which would result in the steering and acceleration controls to be either set to 0% or 100%.

However, for other types of games such as shooting games, the precise targeting that can be provided by using inputs generated by moving a mouse may be more beneficial than the inputs generated by using a joystick of a handheld controller. The inputs generated by the joystick of the controller would not be able to provide an equivalent level of precision, and shooting games that are designed for when a handheld controller is used as an input device often include some form of software based "aim assistance", which may, for example, move a user's target reticule closer to a target once the user's target reticule is within a predetermined distance of the target.

It is in this context that the present disclosure arises.

SUMMARY OF THE INVENTION

In a first aspect, an input system is provided in claim 1. Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
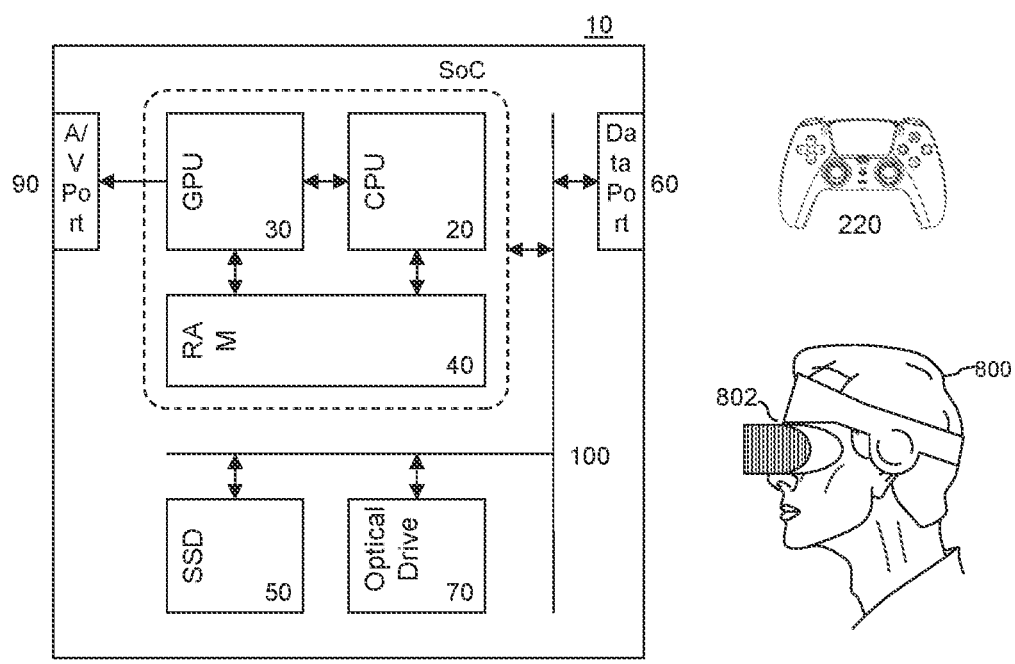
FIG. 1 schematically illustrates an example entertainment system.

Referring now to the drawings, wherein like reference numerals designate identical or corresponding parts throughout the several views, in FIG. 1 an example of an entertainment system 10 is a computer or console such as the Sony® PlayStation 5® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 220, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800. Alternatively or in addition, a TV or monitor may be used.

It is often advantageous to provide a user with an input device comprising a variety of controllable inputs. Input controls provided by an input device may all be input controls of the same type, such as the keys on a keyboard. Alternatively, an input device may comprise a plurality of types of input controls, such as a handheld controller comprising one or more buttons, one or more triggers, and one or more joysticks.

One advantage of using an input device comprising a plurality of input control types, is that it may be easier to remember the function of each input control by mapping one type of function to one type of input control. For example, when controlling a character in a video game using a handheld controller, movement functions, such as walking and moving the viewpoint may be controlled via inputs generated by one or more joysticks on the handheld controller. Meanwhile, action functions, such as interacting with an object or attacking may be controlled by inputs generated by one or more buttons on the handheld controller.

Therefore, it is desirable to increase the variety of input control types that may be provided by an input device.

Figure 2:
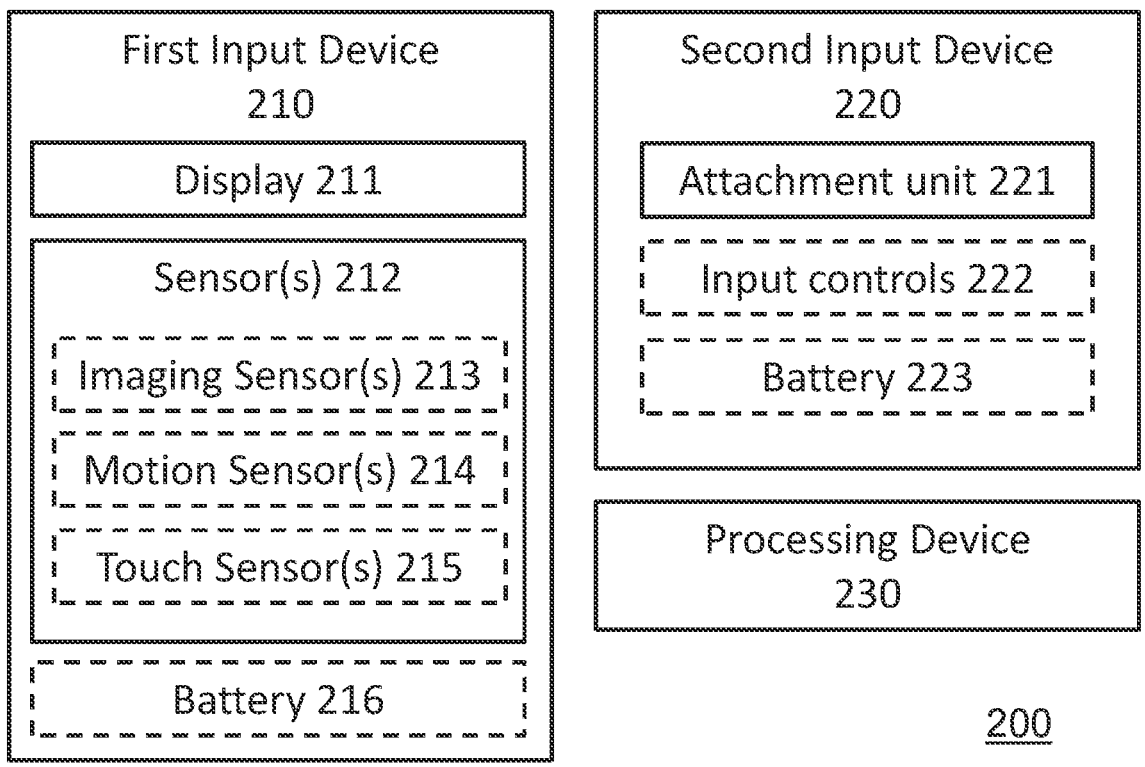
FIG. 2 schematically illustrates an example input system.

FIG. 2 schematically illustrates an input system 200 in accordance with one or more embodiments of the present disclosure. The input system 200 comprises a first input device 210 comprising a display 211 and one or more sensors 212; a second input device 220 comprising an attachment 221 unit for removably attaching the first input device 210 to the second input device 220; and a processing device 230.

The first input device 210 is configured to generate one or more inputs of a first type and the second input device 220 is configured to generate one or more inputs of a second type. Meanwhile, the processing device 230 is configured to receive the one or more inputs of the first type and the one or more inputs of the second type.

It should be noted that the dotted outline of some of the features of FIG. 2 indicate that these features are optional features.

The attachment unit 221 may removably attach the first input device 210 to the second input device 220 in a variety of ways. For example, the attachment unit 221 may be configured to grip the first input device 210 using a grip that is adjustable by a user, or a grip that provides a restoring force to a default position when the grip is displaced, which may enable the grip to be held open to enable the first input device to placed within the grip before the grip is released. Alternatively, or in addition, the attachment unit 221 may be able to removably attach the first input device 210 to the second input device 220 by using a magnet, which may be an electromagnet or a permanent magnet. However, any other mechanism suitable for removably attaching the first input device 210 to the second input device 220 may be used.

The attachment unit 221 itself may be removably attachable to the second input device 220 or may be integral to it. If removably attachable, it may comprise a shell portion that conforms to the contours of at least part of the second input device 220, for example so as to clip around a rear face of the second input device 220 and parts of a nearside and farside edge of the second input device 220 (as seen when held in normal use). Where the shell portion might otherwise cover a functional part of the second input device 220 such as a button, or a light that may be used for optical tracking of the second input device 220, the shell portion may comprise a window or aperture to enable visibility and/or access to this functional part. Where power may be channelled between the first and second input devices 210 220 (as described elsewhere herein), the shell portion may comprise electrical contacts positioned to engage with a corresponding port on the second input device 220. Electrical contacts for engaging with a port of the first input device 210 may be adjustable in position as the first input device 210 (optionally being a mobile phone of the user) may be of unknown dimensions. Alternatively, power may be channelled separately to the attachment unit 221.

In some embodiments, the second input device 220 may comprise one or more inputs controls 222 that may be configured to generate the one or more inputs of the second type. The one or more input controls 222 may comprise, for example, one more buttons, triggers, joysticks, touchscreens, bumpers, motion sensors, or any other suitable input control that may generate an input. Additionally, the processing device 230 may be an entertainment device, such as the entertainment system 10 of FIG. 1 for example.

In some embodiments, the first input device 210 may generate the one or more inputs of the first type using the one or more sensors 212. The one or more sensors 212 may generate the one or more inputs of the first type in a variety of ways.

For example, at least one of the sensors 212 may be a motion sensor 214 that is configured generate motion data indicative of the motion of the first input device 210. A motion sensor 214 may be, for example, an accelerometer, a gyroscope, a positioning sensor (such as GPS), or any other suitable type of motion sensor 214. The first input device 210 may comprise a plurality of motion sensors 214, where at least one of the motion sensors 214 may be a different type to another one of the motion sensors 214 or all of the motion sensors 214 are of the same type. Alternatively, the first input device 210 may only comprise one motion sensor 214.

For example, the first input device 210 may comprise an accelerometer and a gyroscope, or a plurality of accelerometers and a plurality of gyroscopes. Alternatively, or in addition, the first input device 210 may comprise a positioning sensor. It should be noted that these combinations are merely examples and that any possible combination of motion sensors 214 may be used. Additionally, in some embodiments, the first input device 210 may not comprise any motion sensors 214.

The motion data may be indicative of at least one of a linear speed or velocity of the first input device 210, a linear acceleration of the first input device 210, a rotational speed or velocity of the first input device 210, a rotational acceleration of the first input device 210, or any other type of motion of the first input device 210 that may be measurable by a motion sensor 214.

Therefore, the one or more sensors 212 may comprise at least one motion sensor 214 configured to generate motion data indicative of the motion of the first input device 210. The one or more inputs of the first type may comprise data based upon the motion data. For example, the motion data may comprise speed data and acceleration data, whilst the data based upon the motion data may only comprise speed data.

Alternatively, or in addition, the data based upon the motion data may indicate which, if any, values within the motion data are above, below, or within a predetermined range of, one or more predetermined values.

For example, the data based upon the motion data may provide a first indication in response to a speed value within the motion data being above a first predetermined value and may provide a second indication in response to a speed value within the motion data being within a predetermined range of a second predetermined value. In this example, the motion device may not provide the first indication when the speed value within the motion data is not above the first predetermined threshold.

A speed value within the motion data being above a first predetermined value would correspond to the first input device having a speed above the first predetermined value, and a speed value within the motion data being within a predetermined range of a second predetermined value would correspond to the first input device having a speed within a predetermined range of a second predetermined value.

In some cases, the motion data generated by the motion sensor 214 may itself be an input of the first type that is received by the processing device 230. In these cases, the motion data may, for example, be used to control a motion of an object rendered by the processing device 230 to correspond to a motion represented within the motion data.

In some embodiments, the processing device 230 may be configured to track the motion of the first input device 210 in dependence upon at least the data based upon the motion data. For example, the processing device 230 may be configured to track the relative motion of the first input device 210 in dependence upon at least the data based upon the motion data. Alternatively, or in addition, the data based upon the motion data may be positioning data indicative of a position of the first input device 210. In that case, the processing device 230 may be configured to track the motion of the first input device 210 in dependence upon changes in the positioning data.

Returning now to the one or more sensors 212, in some embodiments, the one or more sensors 212 may comprise at least one imaging sensor 213 that may be configured to capture one or more images. It should be noted that the one or more sensors 212 may comprise at least one imaging sensor 213, at least one motion sensor 214, or at least one motion sensor 214 and at least one imaging sensor 213.

In embodiments where the one or more sensors 212 comprise at least one imaging sensor 213 that may be configured to capture one or more images, the one or more inputs of the first type may comprise data based upon the one or more images.

For example, the data based upon the one or more images may be at least one of the one or more images, data indicative of the difference between one of the one or more images and another of the one or more images, at least one depth map indicative of a distance between the imaging sensor 213 and at least one subject imaged by the imaging sensor 213 for at least one respective image of the one or more images, or any other type of data based upon the one or more images that may be a suitable input, such as for example image motion vectors, identified tracking points, so-called eigenface values, gaze direction estimates, and the like.

In some embodiments, the one or more images may comprise at least one image of a user. In this case, the one or more inputs of the first type may comprise data based upon the at least one image of the user. The processing device 230 may be configured to, for example, modify an avatar in dependence upon the data based upon the at least one image of the user.

For example, the processing device 230 may be configured to modify an avatar in dependence upon one or more inputs, which may be inputs of the first type, second type, or a combination of the first type and second type. In some cases, the processing device 230 may be configured to render the avatar. However, in other cases, the avatar may be rendered by another processing device such as a remote server, but the processing device 230 may still be configured to modify the avatar in dependence upon one or more inputs.

When the processing device 230 is configured to modify the avatar in dependence upon the data based upon the at least one image of the user, the processing device 230 may, for example, modify a movement or a facial expression of an avatar to correspond to a movement or a facial expression of the user indicated by the data based upon the at least one image of the user. The avatar would then appear to mimic the movement or the facial expression of the user.

Alternatively, or in addition, the processing device 230 may, for example, modify a movement or a facial expression of an avatar in response to a movement or a facial expression of the user indicated by the data based upon the at least one image of the user. For example, in response to a sudden movement of the user being indicated by the data based upon the at least one image of the user, the processing device 230 may modify the movement or the facial expression of the avatar so that the avatar appears to react in a surprised manner, such as the avatar jumping backwards or having a startled facial expression for example.

It should be noted it is not only a movement or a facial expression of the avatar that may be modified in dependence upon the data based upon the at least one image of the user, and that these specific examples have merely been provided for illustrative purposes. Alternatively, or in addition, the processing device 230 may be configured to, for example, modify an avatar in dependence upon the data based upon the at least one image of the user by modifying a colour of the avatar, an appearance of the avatar, a size of the avatar, a style of the avatar, or any other suitable property of the avatar that may be modified in dependence upon data based upon at least one image of the user. Similarly, facial expressions and/or gestures of the user may be interpreted more generally as inputs; for example a smile or a nod may be treated as a yes, while a frown or a shake of the head may be treated as a no, for example in response to a yes/no type prompt from an application.

In some embodiments, the attachment unit 221 may be configured to change an orientation of the first input device 210 in dependence upon the position of the user within the at least one image of the user. For example, the attachment unit 221 may comprise at least one motor, linear actuator, electromagnet, or any other means that may be configured to change the orientation of the first input device 210.

As an illustrative example, the attachment unit 221 may, in response to a position of a user within a first image, captured by an imaging sensor 213 of the first input device 210, being greater than a predetermined distance from the centre of the first image, change an orientation of the first input device 210 in dependence upon the distance between the position of the user within the first image and the centre of the first image. In this example, the attachment unit 221 may change the orientation of the first input device 210 so that, in a subsequent image captured by the imaging sensor 213, a distance between a position of the user within the subsequent image and the centre of the subsequent image is reduced in comparison to the distance between the position of the user within the first image and the centre of the first image.

Therefore, the attachment unit 221 may be configured to change an orientation of the first input device 210 in dependence upon the position of the user, for example within the at least one image of the user, where the change in orientation may enable at least one of the imaging sensors 213 of the first input device 210 to continuously image the user. The attachment unit 221 may similarly change orientation in dependence upon the position of the user to re-acquire an image of the user if they have moved out of shot (or the input system has been moved so that they move out of shot), for example based upon which part of the image they were last detected in, and/or the relative direction of travel of the user determined from a set of preceding images. It will be appreciated that reference to images of the user herein may refer primarily to images of the user's face.

In some embodiments, the attachment unit 221 may be configured to calculate the change in orientation in dependence upon data based upon the position of the user within the at least one image of the user, which may be received from the first input device 210, the second input device 220, or the processing device 230.

Alternatively, or in addition, at least one of the first input device 210, second input device 220, processing device 230, or an additional processing device may calculate the change in orientation in dependence upon data based upon the position of the user within the at least one image of the user. The attachment unit 221 may be configured to receive the calculated change in orientation from the at least one of the first input device 210, second input device 220, processing device 230, or the additional processing device. The attachment unit 221 may be configured to change the orientation of the first input device 210 in response to the received calculated change in orientation.

In addition, or as an alternative, to the one or more images comprising at least one image of a user, the one or more images may comprise at least one image of an environment. In other words, the one or more images may comprise at least one image of a user, at least one image of an environment, or at least one image of a user and at least one image of an environment.

In embodiments where the one or more images comprise at least one image of a user and at least one image of a user, at least one image of the user may also be at least one image of the environment. Alternatively, or in addition, at least one image of the user may not also be an image of the environment, and/or at least one image of the environment may not also be an image of the user.

Furthermore, the images of the user may be captured by one or more of the imaging sensors 213 of the first input device 210, whilst the images of the environment may be captured by another one or more of the imaging sensors 213. For example, one imaging sensor 213 may face the user and capture at least one image of the user, whilst another imaging sensor 213 may face away from the user and capture at least one image of an environment. Alternatively, at least one image sensor 213 may capture both an image of the environment and an image of the user.

In embodiments where the one or more image comprise at least one image of the environment, the processing device 230 may be configured to generate a model of the environment in dependence upon data based upon the at least one image of the environment. For example, the processing device 230 may be configured to generate a model of the environment by using known "simultaneous localisation and mapping" (SLAM) techniques.

For example, feature points can be detected within the at least one image of the environment using known image recognition techniques. For example, for an image comprising an object having several corner points, a corner detection algorithm such as FAST (Features from Accelerated Segment Test) can be used to extract feature points corresponding to the corners of one or more elements in the image, such as a corner of a chair or a corner of a wall. The feature points are thus identified in the images of the environment and are associated with one another in the sense that the image position of a particular three-dimensional point as captured in one image is associated with the image position of that three-dimensional point as captured in another image. The basis of a typical tracking and mapping system involves deriving, from this information on associated points in one image with points in another image, an internally consistent set of data defining the respective camera viewpoints and the three-dimensional positions of the points. In order for that set of data to be internally consistent, it should lead to a consistent set of three-dimensional positions, and in respect of a particular image, it should lead to a consistent relationship between the camera pose for that image and the expected (and actual) image positions of points as captured by that image.

In some embodiments where the first input device 210 comprises one or more imaging sensors 213 configured to capture one or more images comprising at least one image of an environment and one or more motion sensors 214, the processing device 230 may be configured to track the position of the first input device 210 within the environment in dependence upon a tracked motion (as discussed elsewhere herein) of the first input device 210 and a generated model of the environment (as discussed elsewhere herein).

In some embodiments, the one or more sensors 212 may comprise at least one touch sensor 215 configured to detect contact with the display 211. In these embodiments, the one or more inputs of the first type may comprise data based upon the detected contact with the display 211.

For example, the data based upon the detected contact with the display 211 may be indicative of a combination of one or more of gestures made by the user on the display 211, such as a swipe or tracing a pattern with their finger, a position on the display 211 of the contact with the display 211, and an amount of time the display 211 is contacted for.

In some embodiments, the one or more sensors 212 may comprise a microphone (not shown). In these embodiments, the one or more inputs of the first type may comprise data based upon audio, and typically utterances of the user. These may be parsed for example to provide commands and/or dialog inputs to an application on the processing device 230. If the second input device 220 also comprises a microphone, it may be that the microphone on the first input device 210 (typically being a phone) is superior and so optionally may be used in preference to that of the second input device 220 when available. Similarly optionally, the spatially separated microphones of the first and second input devices 210 and 220 may be used as an array (for example a steerable array) to better isolate speech from the user and thereby improve recognition accuracy where this is beneficial.

Optionally, in some embodiments, the first input device 210 may be configured to receive display data from the processing device 230. In these embodiments, the display 211 may be configured to display the display data.

For example, an external display device may receive a first display data from the processing device 230, and the first input device 210 may receive a second display data from the processing device 230. To further illustrate this example, we may consider the processing device 230 to be an entertainment device, such as entertainment device 10, which may be configured to output game play from a video game. The first display data may be the primary game play video data, whilst the second display data may be supplementary game play video data, such as a minimap or a menu that may be used to interact with the video game.

However, it should be noted that an external display is not an essential feature of some embodiments. For example, the processing device 230 may be configured to output only a first display data, which may be received by the first input device 210 and may not be received by an external display. Alternatively, the display data received by the first input device 210 may be the same as the display data received by an external display. In which case, the display data displayed on the display 211 of the first input device 210 may mirror display data displayed on an external display.

In some embodiments, the first input device 210 and the processing device 230 may be configured to connect to a wireless network. For example, the network may be a local area network (LAN), a personal area network (PAN) between the first input device 210 and the processing device 230, or to a network such as the internet.

In these embodiments, the first input device 210 may be configured to receive the one or more inputs of the second type from the second input device 220, and transmit the one or more inputs of the first type and the one or more inputs of the second type to the processing device via the wireless network. As the first input device 210 may be removably attached to the second input device 220, and the second input device 220 may not comprise hardware that may enable the second input device to connect to the wireless network, the distance that the processing device 230 may receive inputs of the second type may be advantageously increased.

For example, the second input device 220 may be able to connect to either or both of the first input device 210 and the processing device 230 via a short range wireless connection such as Bluetooth®. Meanwhile, both the first input device 210 and the processing device 230 may be configured to connect to a LAN via, for example, Wi-Fi®.

In this example, if the distance between the second input device 220 and the processing device 230 is too large for a Bluetooth® connection to be established or maintained between them, the processing device 230 would not be able to receive the inputs of the second type directly from the second input device 220. However, as the first input device 210 and the second input device 220 may be attached, via the attachment unit 221, the first input device 210 may receive the inputs of the second type from the second input device 220. Then, as both the first input device 210 and the processing device 230 may be configured to connect to a LAN, via Wi-Fi® for example, the processing device 230 may receive both the inputs of the first type and the inputs of the second type from the first input device 210 via the LAN.

The first and second input devices 210 and 220 may communicate via any suitable short range wireless protocol, such as Bluetooth® WiFi Direct® or near field transmission (optionally facilitated by a transmitter in the attachment unit). However, it should be noted that it is not a requirement that the first input device 210 and the second input device 220 are connected to each other via a wireless communication means, and may instead be connected via a wired connection.

Alternatively or in addition to the second input device 220 sending and/or receiving data to/from the processing device 230 via the first input device 210 and a wired or wireless connection, the respective input devices may communication with the processing device 230 independently, or the first input device 210 may send and/or receive data from the processing device 230 via the second input device 220; in this case it is assumed that the second input device 220 is operable to establish communications with the processing device 230. The first input device 210 may then be able to communicate with the processing device 230 via the second input device 220 without registration (or optionally re-registration) by virtue of its use with the second input device 220, which will be with the knowledge of the user.

In some embodiments, the first input device 210 may comprise a first battery 216 and the second input device 220 may comprise a second battery 223. In these embodiments, one of the first input device 210 and the second input device 220 may be configured to charge the battery 216 or 223 of the other one of the first input device 210 and the second input device 220 via the attachment unit 221.

Therefore, for example, if one of the first input device 210 and the second input device 220 is low on power, whilst the other one of the first input device 210 and the second input device 220 is not, the input unit that is not low on power may charge the other input device.

Optionally, the one of the first input device 210 and the second input device 220 may be configured to charge the battery 216 or 223 of the other one of the first input device 210 and the second input device 220 via the attachment unit using one or more selected from the list consisting of: i) a wired charging means; and ii) a wireless charging means.

In some embodiments, the second input device 220 may comprise a second battery 223. In these embodiments, the first input device 210 may be configured to receive, from the second input device 220, information indicative of a state of the second battery 223. Additionally, the display 211 may be configured to display at least a part of the received information indicative of the state of the second battery 223.

For example, the information indicative of the state of the second battery 223 may be information indicative of a charge level of the second battery, an estimate of the amount of time remaining before the second battery 223 runs out of charge, a warning that the charge level of the second battery 223 below a predetermined threshold, or any other suitable information that may be indicative of the state of the second battery 223.

In some embodiments, the first input device 210 may be a smartphone. This may be advantageous as smartphones are in common use and typically comprise a display and at least one sensor. Therefore, a user may be able to utilise the techniques of the present invention without having to purchase an additional input device.

Figure 3:
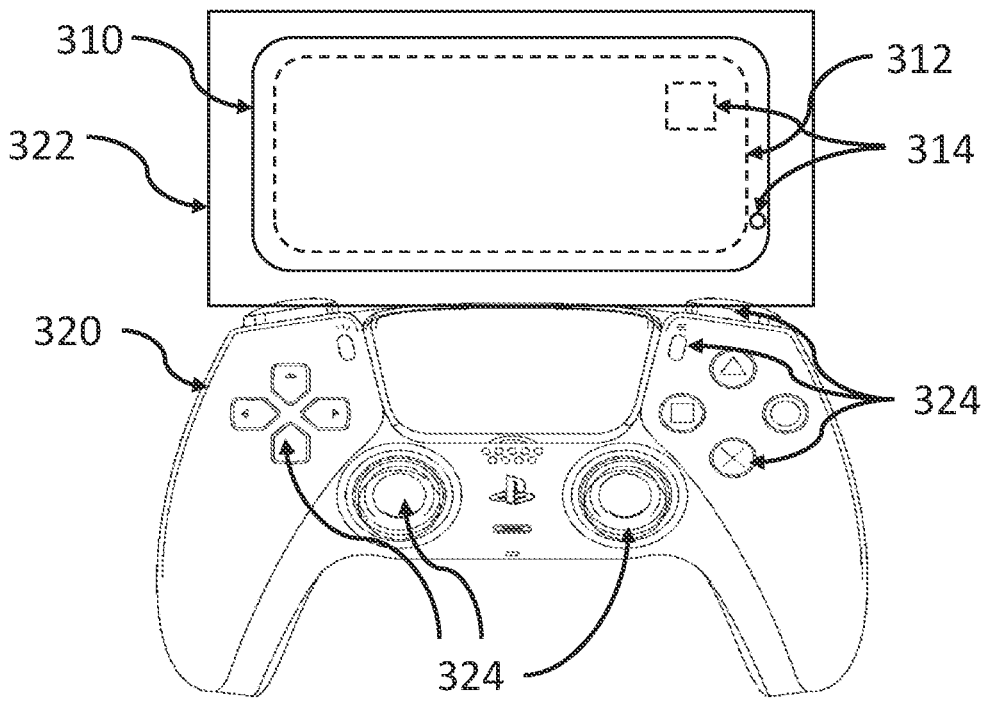
FIG. 3 illustrates another example input system.

FIG. 3 illustrates an example embodiment of the present disclosure. FIG. 3 shows a first input device 310 (210) removably attached to a second input device 320 (220) via an attachment unit 322 (221). In this example, the first input device 310 may be a smartphone and the second input device 320 may be a handheld controller.

The first input device 310 may comprise a display 312, which may also be a touch sensor, and two other sensors 314. The other sensor 314 that is shown as a dotted outline of a square may be a motion sensor for example, such as an accelerometer, whilst the other sensor 314 that is shown as a solid outline of a circle may be an imaging sensor, such as a front facing camera. The first input device 310 may comprise other sensors that are not shown such as a rear facing camera. The one or more sensors 312 and 314 may be configured to generate one or more inputs of the first type.

The second input device 320 comprises the attachment unit 322, to which the first input device 310 is removably attached, and one or more input controls 324 that may be configured to generate one or more inputs of a second type.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An input system comprising:
a first input device comprising a display and one or more sensors, wherein the first input device is configured to generate one or more inputs of a first type, wherein the one or more sensors comprise at least one imaging sensor configured to capture one or more images that comprise at least one image of a user, and wherein the one or more inputs of the first type comprise data based upon the one or more images;
a second input device comprising an attachment unit for removably attaching the first input device to the second input device, wherein the second input device is configured to generate one or more inputs of a second type, and wherein the attachment unit is configured to change an orientation of the first input device in dependence upon a position of the user; and
a processing device configured to (i) receive the one or more inputs of the first type and the one or more inputs of the second type and (ii) modify an avatar in dependence upon data based upon the at least one image of the user.

2. The input system according to claim 1, wherein the one or more sensors are configured to generate the one or more inputs of the first type.

3. The input system according to claim 1, wherein
the one or more sensors comprise at least one motion sensor configured to generate motion data indicative of motion of the first input device;
the one or more inputs of the first type comprise data based upon the motion data; and
the processing device is configured to track the motion of the first input device in dependence upon at least the data based upon the motion data.

4. The input system according to claim 1, wherein the first input device is configured to receive display data from the processing device; and the display is configured to display the display data.

5. The input system according to claim 1, wherein
the first input device and the processing device are configured to connect to a wireless network; and
the first input device is configured to receive the one or more inputs of the second type from the second input device and transmit the one or more inputs of the first type and the one or more inputs of the second type to the processing device via the wireless network.

6. The input system according to claim 1, wherein the one or more sensors comprise at least one touch sensor configured to detect contact with the display; and the one or more inputs of the first type comprise data based upon the detected contact with the display.

7. The input system according to claim 1, wherein
the first input device comprises a first battery;
the second input device comprises a second battery; and
one of the first input device and the second input device is configured to charge the battery of the other one of the first input device and the second input device via the attachment unit.

8. The input system according to claim 7, wherein the one of the first input device and the second input device is configured to charge the battery of the other one of the first input device and the second input device via the attachment unit using one or more selected from the list consisting of:
i) a wired charging means; and
ii) a wireless charging means.

9. The input system according to claim 1, wherein
the second input device comprises a second battery;
the first input device is configured to receive, from the second input device, information indicative of a state of the second battery; and
the display is configured to display at least a part of the received information indicative of the state of the second battery.

10. The input system according to claim 1, wherein the first input device is a smartphone.

11. An input system comprising:
a first input device comprising a display and one or more sensors, wherein the first input device is configured to generate one or more inputs of a first type;
a second input device comprising an attachment unit for removably attaching the first input device to the second input device, wherein the second input device is configured to generate one or more inputs of a second type, and wherein the attachment unit is configured to change an orientation of the first input device in dependence upon a position of a user; and
a processing device configured to receive the one or more inputs of the first type and the one or more inputs of the second type.

12. The input system according to claim 11, wherein
the one or more sensors comprise at least one imaging sensor configured to capture one or more images; and
the one or more inputs of the first type comprise data based upon the one or more images.

13. The input system according to claim 12, wherein
the one or more images comprise at least one image of the user; and
the processing device is configured to modify an avatar in dependence upon data based upon the at least one image of the user.

14. The input system according to claim 12, wherein
the one or more images comprise at least one image of a real-world environment; and
the processing device is configured to generate a model of the environment in dependence upon data based upon the at least one image of the environment.

15. The input system according to claim 14, wherein the processing device is configured to track the position of the first input device within the environment in dependence upon a tracked motion of the first input device and the generated model of the environment.

* * * * *